2 Sheets--Sheet 1.

F. CRAMER.
Devices for Teaching Music.

No. 152,726.    Patented July 7, 1874.

Witnesses:
Anton W. Fischer
J. M. Bloomer

Inventor:
Francis Cramer

F. CRAMER.
Devices for Teaching Music.
No. 152,726.  Patented July 7, 1874.
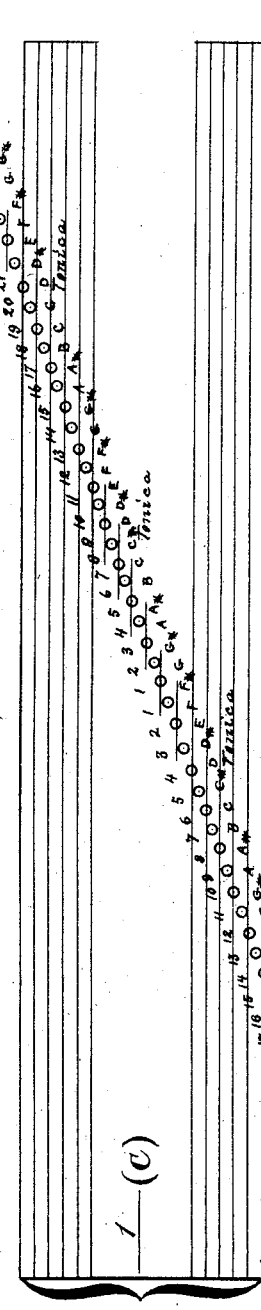
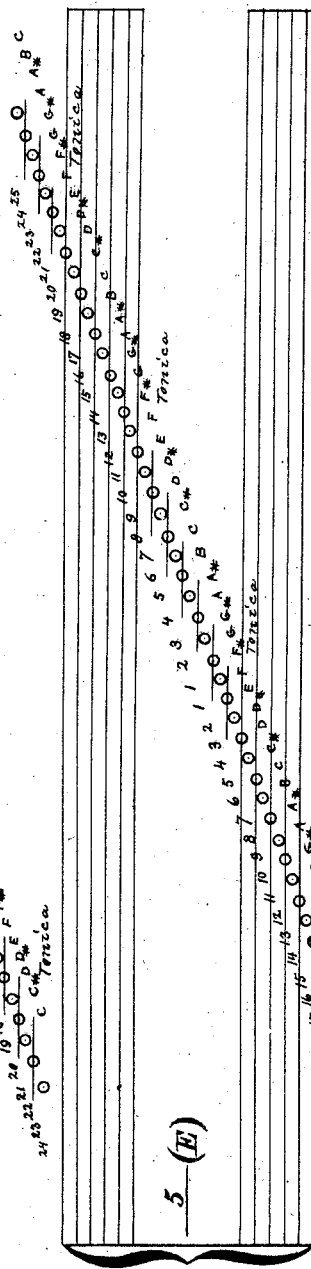
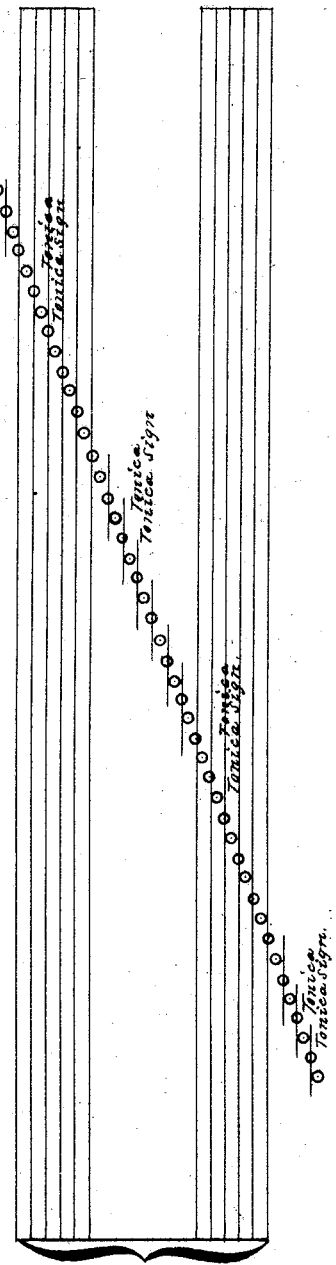
Witnesses:
Anton W. Fischer
J. M. Bloomer
Inventor:
Francis Cramer

UNITED STATES PATENT OFFICE.

FRANCIS CRAMER, OF TOLEDO, OHIO.

IMPROVEMENT IN DEVICES FOR TEACHING MUSIC.

Specification forming part of Letters Patent No. 152,726, dated July 7, 1874; application filed March 14, 1874.

*To all whom it may concern:*

Be it known that I, FRANCIS CRAMER, of the city of Toledo, Lucas county, State of Ohio, have invented a new Technical System of Music, by means of which the labor of learning music is materially reduced; and I hereby declare that the following is a full and exact description thereof, having reference to the accompanying drawing, and to the numbers and letters marked thereon, it being a part of this specification.

The nature of my invention consists in enabling the musician, by means of another key-board and differently-arranged notes, to attain the same proficiency in music by learning to play one key that he acquires by learning to play out of the present twelve keys. In fact, any one of the twelve keys in this system is played in the very same manner, thus saving the labor of making a separate study of more than one of them. The technical nature of my invention consists in taking upon my key-board six white and six black keys for an octave, arranged alternately, (instead of seven white and five black keys, as arranged and used in the old method,) in connection with a slider or sign-board and a scale.

Figure 1:
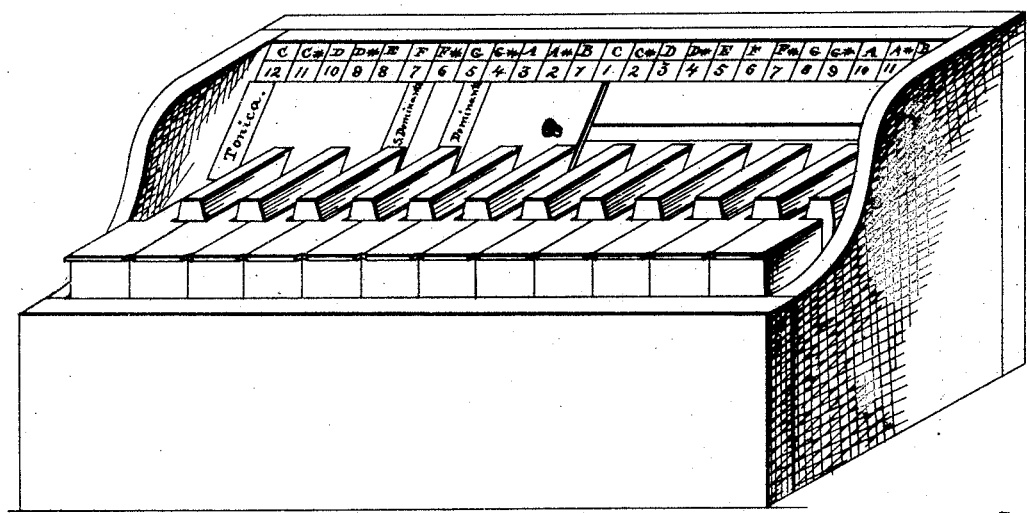

The old method of recognizing the octaves by the arrangement of the keys is materially improved upon by means of a sign-board, as shown in the drawing. This sign-board may be movable or stationary, as the arrangement of notes in Drawings Nos. 2 and 3 may require. If movable, this sign-board must have room to slide one octave longer than the key-board. By this means any one of the white keys may be made the tonica, and all the other keys will be changed accordingly by a single move of the sign-board from right to left, or from left to right. In playing music which requires a black key to become the tonica, the tonica-sign must be placed on the first white key to the left; then the first black key to the right of the tonica-sign will be the tonica, as indicated on Drawing No. 4 and Figure 1. Music written for any particular white key may be played in any other white one, the only preparation necessary being the moving of the sign-board. The same rule applies to the black keys. The sign-board must therefore, preferably, always be movable, whatever may be the arrangement of the notes.

Figure 2:
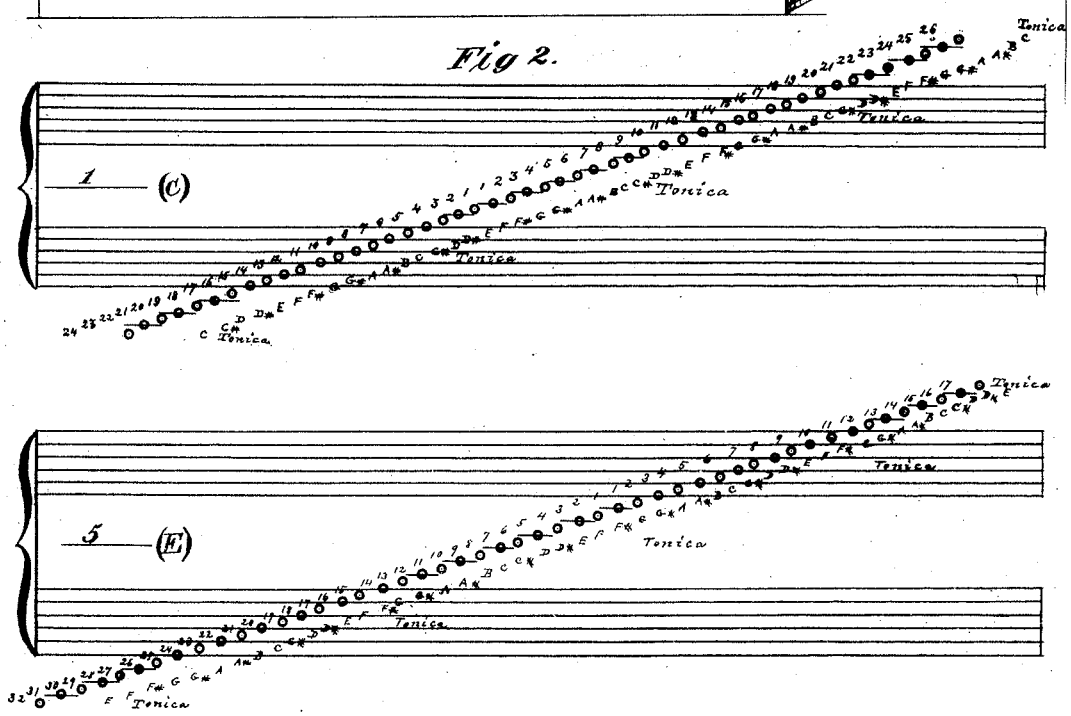

This system facilitates the reading of notes in a great measure, as each note occupies a relative and regular position in each octave of lines. The written octave, as indicated in connection with my apparatus, Fig. 2, being composed of six lines or six auxiliaries, as shown in Drawings Nos. 2 and 3, no different reading of bass, violin, or any other clef is required.

By adapting twelve places—viz., six lines and six spaces—instead of seven places, as used by the old method, we entirely obviate the use of accidentals, such as sharps, and flats.

The fact that each note always occupies a relative position in each octave enables me to transpose whole octaves. Said transposition must be indicated by some sign, for example, $\perp$ indicating that the octave in which it is introduced must be played one octave higher than its natural position, and the sign T indicates that the octave in question must be played one octave lower than its natural position.

As the drawings show, I have indicated the keys and notes both by letters, as used in the old method, and by figures. I prefer the latter for use with my invention. These numbers may be counted up or down from a point at the center, or up and down from a point at either end of the key-board. Also, if notes are written according to intervals, as in Drawing No. 2, we are at liberty to put the tonica in any other place than the one used in said drawing, according to whatever usage may require.

What I claim, and desire to secure by Letters Patent, is—

The key-board herein described, composed of alternate white and black keys, in combination with a scale of figures or letters and a slider, substantially as and for the purpose specified.

FRANCIS CRAMER.

Witnesses:
ANTON W. FISCHER,
J. M. BLOOMER.